(12) United States Patent
Takano

(10) Patent No.: US 7,796,996 B2
(45) Date of Patent: Sep. 14, 2010

(54) WIRELESS DEVICE

(75) Inventor: Kiyoshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1239 days.

(21) Appl. No.: 11/360,422

(22) Filed: Feb. 24, 2006

(65) Prior Publication Data

US 2006/0154609 A1 Jul. 13, 2006

(30) Foreign Application Priority Data

Sep. 1, 2005 (JP) .............................. 2005-254131

(51) Int. Cl.
*H04W 72/00* (2009.01)
*H04W 4/00* (2009.01)

(52) U.S. Cl. .................... 455/450; 455/453; 370/329; 370/431

(58) Field of Classification Search ............... 455/450, 455/453; 370/328, 329, 431, 908, 912, 913
See application file for complete search history.

(56) References Cited

U.S. PATENT DOCUMENTS

| | | | | |
|---|---|---|---|---|
| 5,392,449 A | * | 2/1995 | Shaughnessy et al. | 455/450 |
| 5,890,056 A | * | 3/1999 | Garner et al. | 455/67.11 |
| 6,081,720 A | * | 6/2000 | Sampson | 455/450 |
| 6,370,117 B1 | * | 4/2002 | Koraitim et al. | 370/232 |
| 2002/0035699 A1 | | 3/2002 | Crosbie | |
| 2002/0085719 A1 | | 7/2002 | Crosbie | |
| 2002/0136226 A1 | | 9/2002 | Christoffel et al. | |

FOREIGN PATENT DOCUMENTS

| | | |
|---|---|---|
| JP | 10-041969 | 2/1998 |
| JP | 2004-514383 | 5/2004 |
| JP | 2004-221684 | 8/2004 |
| JP | 2004-350052 | 12/2004 |
| WO | 02/41587 | 5/2002 |
| WO | 02/077820 | 10/2002 |

* cited by examiner

*Primary Examiner*—Quochien B Vuong
(74) *Attorney, Agent, or Firm*—Staas & Halsey LLP

(57) ABSTRACT

The wireless device judges whether information transmitted and received by the user devices is non-realtime system data or realtime system data, acquires a receiving sensitivity of each channel, transmits, to a server, the number of user devices, a notification that the information transmitted and received is the non-realtime system data or the realtime system data, and the receiving sensitivity of each channel, and receives, when transmitting to the server the notification that the information transmitted and received by the user devices is the non-realtime system data, a first channel information sent by the server, and further receives, when transmitting to the server the notification that the information transmitted and received by the user devices is the realtime system data, a second channel information sent by the server.

10 Claims, 15 Drawing Sheets

FIG. 6

| APPLICABLE FRAME (SUB) TYPES | BITS 0-3 | BITS 4 | BITS 5-6 | BITS 7 | BITS 8-15 |
|---|---|---|---|---|---|
| QOS(+)CF-POLL FRAMES SENT BY HC | TID | SCHEDULE PENDING | ACK POLICY | RESERVED | TXOP LIMIT IN UNITS OF 32 MICROSECONDS |
| QOS DATA, QOS CF-ACK AND QOS DATA+CF-ACK FRAMES SENT BY HC | TID | SCHEDULE PENDING | ACK POLICY | RESERVED | RESERVED |
| QOS DATA TYPE FRAMES SENT BY NON-AP QSTAS | TID | 0 | ACK POLICY | RESERVED | TXOP DURATION REQUESTED IN UNITS OF 32 MICROSECONDS |
| | TID | 1 | ACK POLICY | RESERVED | QUEUE SIZE IN UNITS OF 256 OCTETS |

FIG. 7

| BITS 0-3 | USAGE |
|---|---|
| 0-7 | UP FOR PRIORITIZED QOS(TC) |
| 8-15 | TSID FOR PARAMETERIZED QOS |

FIG. 8

| USER PRIORITY (UP-SAME AS 802.1D USER PRIORITY)) | 802.1D DESIGNATION | ACCESS CATEGORY (AC) | DESIGNATION (INFORMATIVE) | DATA TYPE |
|---|---|---|---|---|
| 1 | BK | 0 | BEST EFFORT | NON-REALTIME SYSTEM DATA |
| 2 | — | 0 | BEST EFFORT | |
| 0 | BE | 0 | BEST EFFORT | |
| 3 | EE | 1 | VIDEO PROBE | REALTIME SYSTEM DATA |
| 4 | CL | 2 | VIDEO | |
| 5 | VI | 2 | VIDEO | |
| 6 | VO | 3 | VOICE | |
| 7 | NC | 3 | VOICE | |

WIRELESS DEVICE

BACKGROUND OF THE INVENTION

The present invention relates to a wireless device performing wireless communication with a plurality of user devices.

Over the recent years, utilization of wireless LAN (Local Area Network) has become active, and the wireless LAN has been utilized for applications such as data communications, voice/image communications, etc. Particularly as to the voices, a voice terminal for the wireless LAN employing VoIP (Voice Over Internet Protocol) appears, and therefore the indispensables are load-balancing on the side of the wireless LAN devices (which are also called access points) and a high-speed roaming function. The load-balancing performed by the access points includes adjusting among the access points in order to average the number of the user devices (which are also referred to as clients) connected to the respective access points. Further, the high-speed roaming is actualized by utilizing a virtual access point technology in a way that virtualizes a group of neighboring cells of the same channel as if operating as one single access point. In pieces of data transmitted and received between the access point and the client, there exist realtime system data such as voice data and image data and non-realtime system data such as character data.

[Patent document 1] Japanese Patent Application Laid-Open Publication No. 10-41969

[Patent document 2] Japanese Patent Application Laid-Open Publication No. 2004-221684

[Patent document 3] Japanese Patent Application Laid-Open Publication No. 2004-350052

[Patent document 4] Japanese Unexamined Patent Publication No. 2004-514383

SUMMARY OF THE INVENTION

As to the load-balancing, however, it is not judged whether the data transmitted and received by the client is realtime system data or non-realtime system data, and hence the wireless LAN resources are not effectively utilized. It is an object of the present invention to previously judge whether the data transmitted and received by the client is the realtime system data or the non-realtime system data, and further to effect the load-balancing on the basis of a receiving sensitivity between the client and the access point and a connection count of the clients to the wireless communication channels held by the access point. It is another object of the present invention to connect in a well balance the clients transmitting and receiving the realtime system data and the clients transmitting and receiving the non-realtime system data to the wireless communication channels held by the access point.

The present invention adopts the following means in order to solve the above problems.

(1) Namely, a wireless device (the wireless device) according to the invention of the application is a wireless device performing wireless communication with a plurality of user devices and performing wire communication with a server, comprising a wireless communication module performing wireless communication with the user devices by use of a plurality of channels, a judging module judging whether information transmitted and received by the user devices is non-realtime system data or realtime system data, a receiving sensitivity acquisition module acquiring a receiving sensitivity of each channel, a transmitting module transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel, and a receiving module receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server. With this constitution, the wireless device judges the data transmitted and received by the user devices, and receives the first channel information or the second channel information from the server. It is therefore possible to receive, from the server, the information enabling the effective load-balancing to be performed among the user devices transmitting and receiving the non-realtime system data or the user devices transmitting and receiving the realtime system data.

(2) Further, the wireless device may be configured so that the wireless communication module employs the channels for the wireless communications with the user devices on the basis of the first channel information or the second channel information. With this constitution, the channels are employed for the wireless communications with the user devices on the basis of the first channel information or the second channel information. Hence, It is feasible to perform the effective load-balancing among the user devices transmitting and receiving the non-realtime system data or the user devices transmitting and receiving the realtime system data.

(3) Moreover, the wireless device may also be configured so that the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information. With this constitution, the first channel information determined by the server on the basis of the predetermined conditional expression from the predetermined value and the number of the user devices, is received from the server, and, the second channel information determined by the server on the basis of the predetermined value, is received from the server. Therefore, the load-balancing can be performed effectively among the user devices transmitting and receiving the non-realtime system data by use of the first channel information determined based on the predetermined conditional expression from the predetermined value and the number of the user devices. Further, the load-balancing can be performed effectively among the user devices transmitting and receiving the realtime system data by use of the second channel information determined based on the predetermined value.

(4) Moreover, a server (the server) according to the invention of the application is a server performing wire communication with a plurality of wireless devices, comprising, a receiving module receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels, a calculating module calculating a predetermined value from the receiving sensitivity of each channel, a channel determination module, when receiving notification purporting that the information transmitted and received by the user devices is non-realtime system data, determining the first channel information on the basis of a predetermined conditional expression from the number of user devices and the predetermined value, and a transmitting module transmitting the thus-determined first channel information to the wireless devices. With this constitution, the server, when receiving the notification purporting that the information transmitted and received by the user devices is non-realtime system data, determines the first channel information on the basis of the predetermined conditional expression from the number of user devices and the predetermined value, and transmits the thus-determined first channel information to the wireless devices. Therefore, it is possible to transmit to the wireless device the information enabling the effective load-balancing to be performed among the user devices transmitting and receiving the non-realtime system data.

(5) Still further, the server may be configured so that the channel determination module, when receiving the notification purporting that the information transmitted and received by the user devices is the realtime system data, determines the second channel information on the basis of the predetermined value, and the transmitting module transmits the thus-determined second channel information to the wireless devices. With this constitution, the server, when receiving the notification purporting that the information transmitted and received by the user devices is the realtime system data, determines the second channel information on the basis of the predetermined value, and the transmits the thus-determined second channel information to the wireless devices. It is therefore feasible to transmit to the wireless devices the information enabling the effective load-balancing to be performed among the user devices transmitting and receiving the realtime system data.

According to the invention, the clients transmitting and receiving the realtime system data and the clients transmitting and receiving the non-realtime system data, can be connected in a well balance to the wireless communication channels held by each access point. Moreover, according to the wireless LAN resources can be effectively utilized by establishing the well-balanced connections to the wireless channels held by each access point.

BRIEF DESCRIPTION OF THE DRAWINGS

FIG. 6 is a diagram showing QoS Control field in FIG. 5.

FIG. 7 is a diagram showing TID field in FIG. 6.

FIG. 8 is a diagram showing User priority to Access Category mappings.

DETAILED DESCRIPTION OF THE INVENTION

A best mode (which will hereinafter be termed an embodiment) for carrying out the present invention will hereinafter be described with reference to the drawings. A configuration of the following embodiment is an exemplification, and the present invention is not limited to the configuration of the embodiment.

Figure 1:
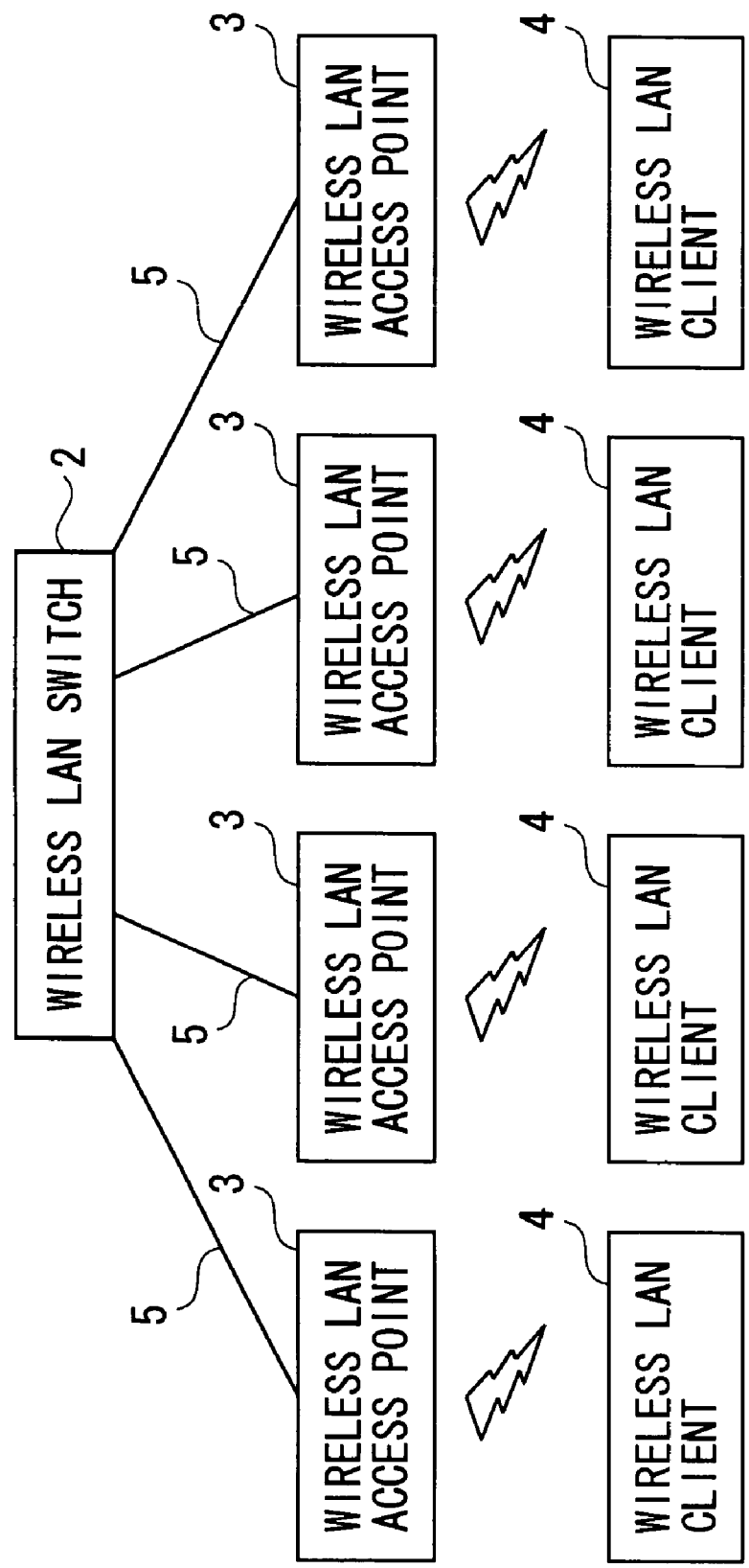
FIG. 1 is a diagram showing an architecture of a network system of the invention.

FIG. 1 is a diagram showing an architecture of a network system of the present invention. In FIG. 1, the network system is configured by a wireless LAN server 1 (corresponding to a [server] according to the present invention), a wireless LAN switch 2, a plurality of wireless LAN access points 3 (corresponding to [wireless devices] according to the present invention) and a plurality of wireless LAN clients 4 (corresponding to [user devices] according to the present invention). FIG. 1 shows a case where four wireless LAN points are provided, however, the number of the wireless LAN access points is not limited to 4. Further, FIG. 1 shows a case where four wireless clients are provided, however, the number of the wireless LAN clients is not limited to 4.

The wireless LAN server 1 performs communications via a LAN cable 5 with the wireless LAN switch 2. Further, the wireless LAN server 1 aggregates receiving sensitivities of respective wireless channels held by each access point, and records the receiving sensitivities. The wireless LAN switch 2 performs the communications via the LAN cable 5 with the wireless LAN server 1 and the wireless LAN access points 3. Moreover, the wireless LAN switch 2 relays the communications between the wireless LAN server 1 and the wireless LAN access points 3. The wireless LAN access point 3 performs the communications via the LAN cable 5 with the wireless LAN switch 2. Further, the access point 3 performs the communications via the LAN cable 5 with the wireless LAN switch 2. Still further, the access point 3 executes the communications via the wireless LAN with the wireless LAN client 4.

Each wireless LAN access point 3 has SSID (Service Set Identifier) that is common among the respective wireless LAN access points 3, a unique wireless MAC address (Media Access Control address) used for the wireless LAN, and a unique wire MAC address used for a wired LAN. The SSID is used for judging whether or not the wireless LAN client 4 can be connected to the wireless LAN access point 3. Further, the wireless MAC address and the wire MAC address are used for identifying the individual wireless LAN access point 3.

The wireless LAN client 4 has a unique wireless MAC address used for the wireless LAN. The wireless MAC address is used for identifying the individual wireless LAN client 4. A communication network connecting the wireless LAN server 1 to the wireless LAN access point 3 can include utilizing, e.g., Ethernet (registered trademark).

The wireless LAN server 1 is connected via the LAN cable 5 to the wireless LAN access point 3. The communications between the wireless LAN server 1 and each wireless LAN access point 3 are performed via the LAN cable 5. The communications between the respective wireless LAN access points 3 are performed via the LAN cables 5. The wireless LAN communications between the wireless LAN access points 3 and the respective wireless LAN clients 4 are performed through the wireless LAN. The wireless LAN communications can be effected by use of a plurality of wireless channels. The wireless channel is allocated in a way that divides a frequency band utilized for the wireless LAN communications. In the wireless LAN, if the wireless channel having the same frequency band is utilized between the wireless LAN access point 3 and the wireless LAN client 4, the wireless LAN access point 3 and the wireless LAN client 4 can perform the communications. The wireless LAN client 4, when the wireless channel of the wireless LAN access point 3 is switched over, scans the wireless channels by itself, and selects a wireless channel enabling the communications with the wireless LAN access point 3. Further, the wireless LAN client 4 can transmit, to the wireless LAN access point 3, a packet recorded with information showing whether data to be transmitted and received is defined as realtime system data or non realtime system data.

Figure 2:
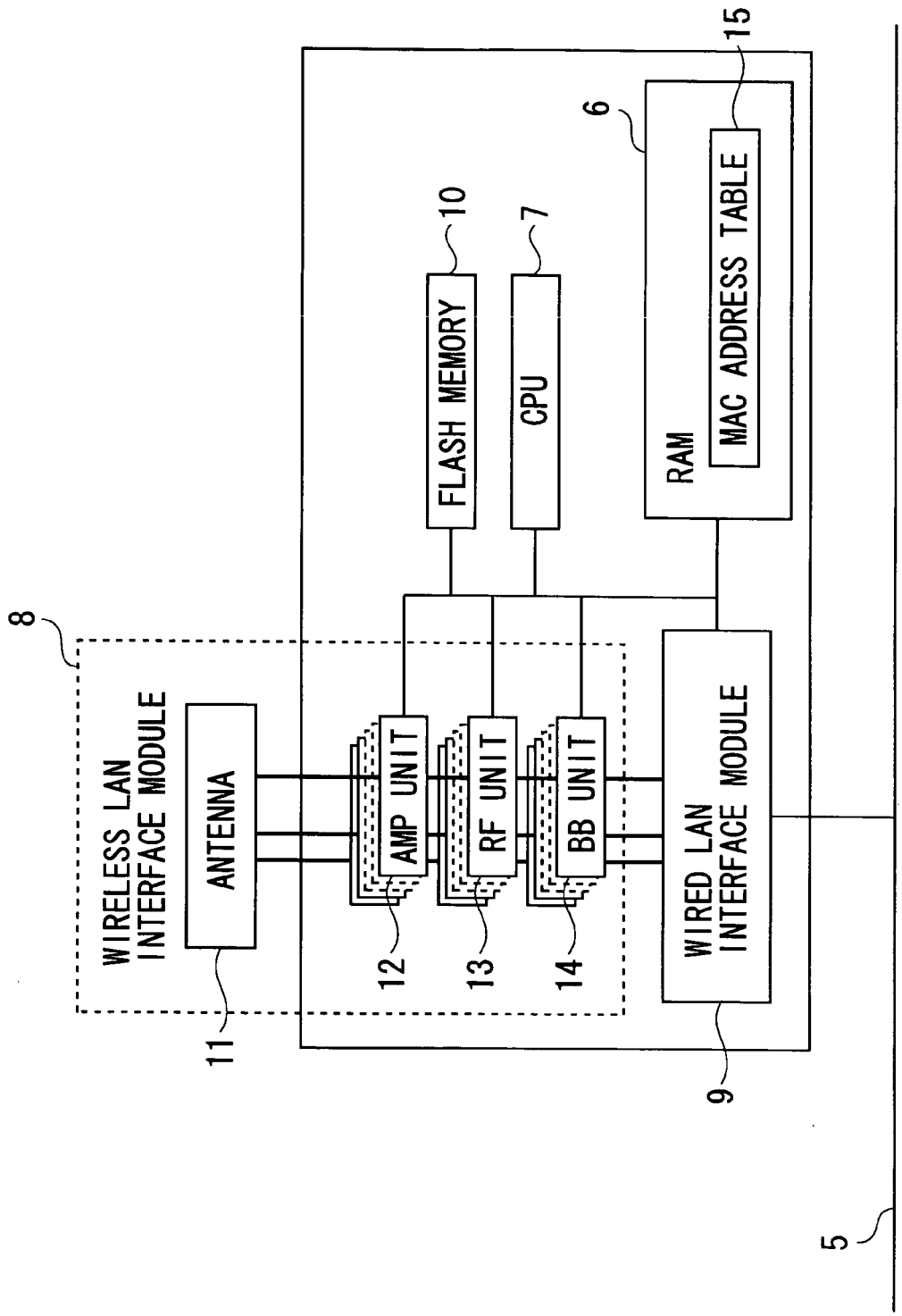
FIG. 2 is a block diagram showing a configuration of a wireless LAN access point of the invention.

FIG. 2 is a block diagram showing a configuration of the wireless LAN access point 3 of the present invention. In FIG. 2, the wireless LAN access point (which will hereinafter be simply also termed an [access point]) includes a random access memory (RAM) 6, a central processing unit (CPU) 7, a wireless LAN interface module 8, a wired LAN interface module 9, and a flash memory (Flash Memory) 10. The wireless LAN interface module 8 has an antenna 11, an AMP (Amplifier) unit 12, an RF (Radio Frequency) unit 13 and a BB (Base Band) unit 14. The AMP unit 12, the RF unit 13 and the BB unit 14 are each provided by n-pieces corresponding to n-pieces of wireless channels held by the access point.

The random access memory 6 is a storage medium utilized as an operation area in such a case that the CPU 7 executes a control program of the wireless LAN. On the random access memory 6, a MAC address table 15 is created as an area for managing the data used when executing the control program. The MAC address table 15 is recorded with the wire MAC address and the wireless MAC address.

The CPU 7 executes the wireless LAN control programs (such as firmware and a driver) stored on the flash memory 10. The CPU 7 utilizes the random access memory 6 as a temporary storage medium (buffer) when executing the programs.

The antenna 11 transmits radio waves to the wireless LAN client (which will hereinafter simply also be called a [client]), and receives the radio waves from the client. The AMP unit 12 amplifies signals outputted from the RF unit 13, and performs the wireless LAN communications with the client. The AMP unit 12 receives the signals of the wireless LAN communications from the client, converts a receiving level, and outputs the signal to the RF unit 13. The RF unit 13 effects analog-to-digital conversion of the signals to be transmitted to the client and the signals received from the client. The BB unit 13 executes digital-signal processing of the signals to be transmitted to the client and the signals received from the client.

Figure 3:
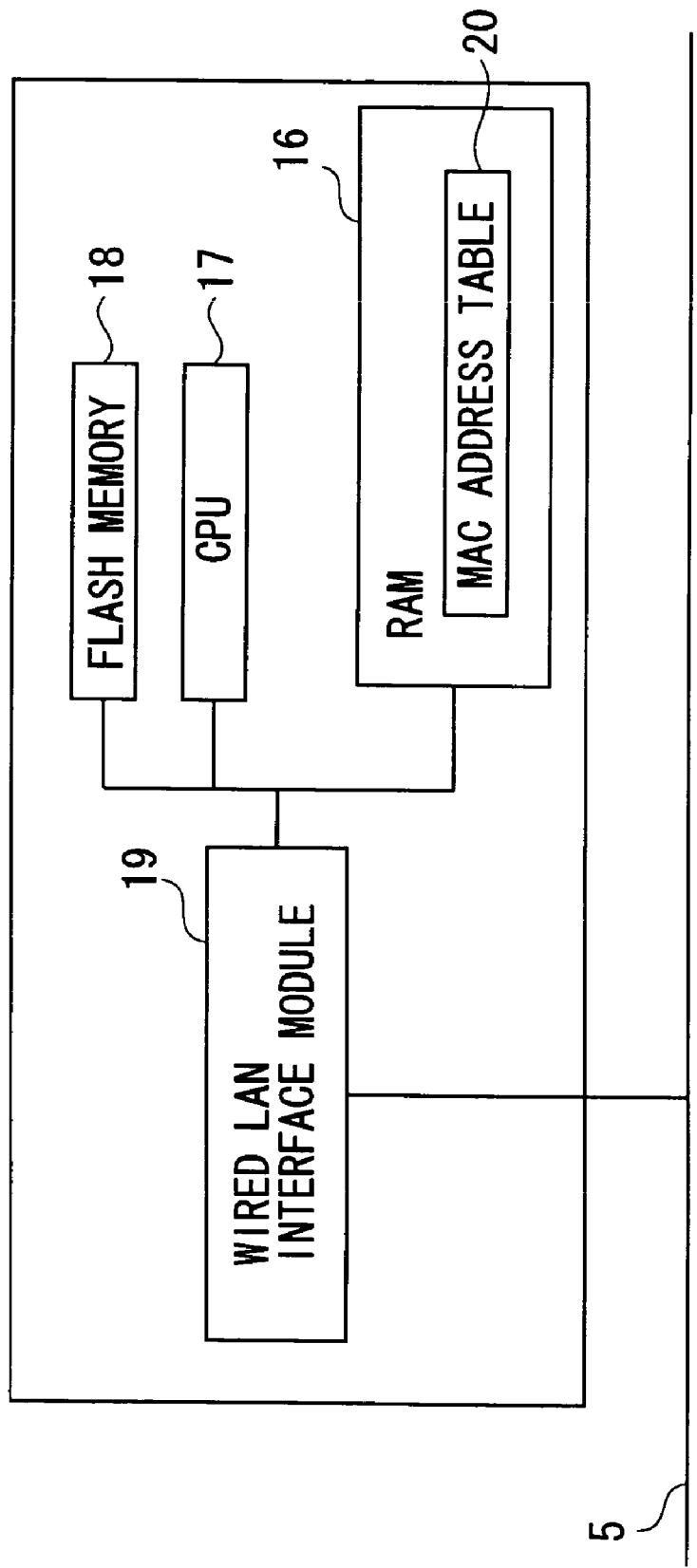
FIG. 3 is a block diagram showing a configuration of a wireless LAN server of the invention.

FIG. 3 is a block diagram showing a configuration of the wireless LAN server of the present invention. In FIG. 3, the wireless LAN server (which will hereinafter be simply also termed a [server]) includes a random access memory (RAM) 16, a central processing unit (CPU) 17, a flash memory (Flash Memory) 18 and a wired LAN interface module 19. The random access memory 16 is a storage medium utilized as an operation area in such a case that the CPU 17 executes the wireless LAN control program. On the random access memory 16, a MAC address table 20 is created as an area for managing the data used when executing the control program. The MAC address table 20 is recorded with the wire MAC address and the wireless MAC address.

The CPU 17 executes the wireless LAN control programs (such as firmware and a driver) stored on the flash memory 18. The CPU 17 utilizes the random access memory 16 as a temporary storage medium (buffer) when executing the programs.

Figure 4:
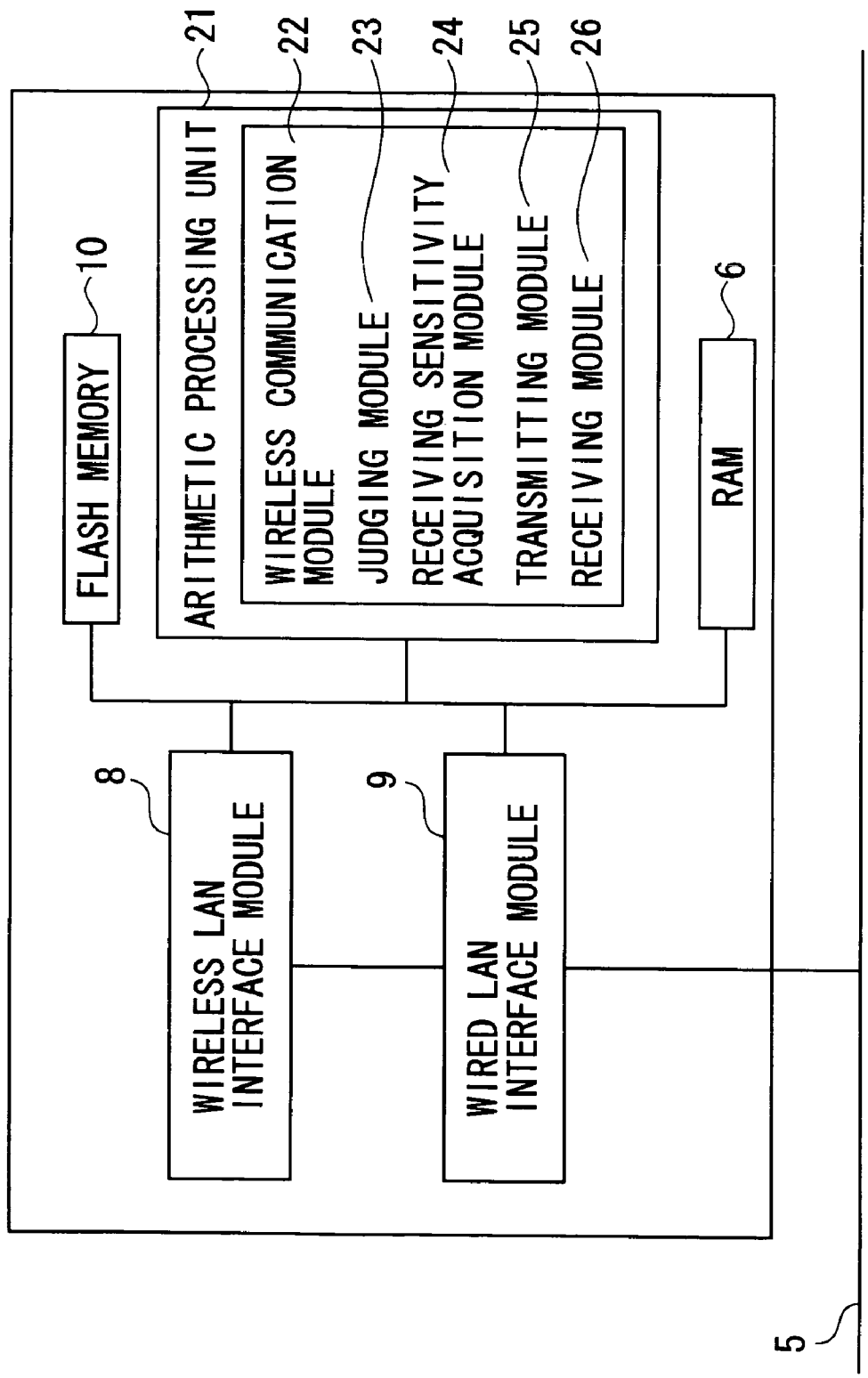
FIG. 4 is a block diagram showing functions of the access point.

FIG. 4 is a function block diagram showing functions of the access point. As shown in FIG. 4, the access point has an arithmetic processing unit 21. The arithmetic processing unit 21 is constructed of a CPU, a main memory, etc and has functions as a wireless communication module 22, a judging module 23, a receiving sensitivity acquisition module 24, a transmitting module 25 and a receiving module 26. These functions can be actualized by way of, e.g., computer programs executed by the CPU.

The wireless communication module 22 performs the wireless LAN communications with the clients by using a plurality of wireless channels. The wireless communication module 22 sequentially switches over the wireless channels, and can effect the wireless LAN communications with the respective clients. Further, the wireless communication module 22 can receive packets transmitted by the clients.

The judging module 23 judges whether the data transmitted and received by the client performing the wireless LAN communications by employing the wireless channels is the non-realtime system data or the realtime system data. The data is judged based on the Standards of IEEE (Institute of Electrical and Electronic Engineers) 802.11e. According to IEEE802.11e, frames to be transmitted are categorized into four access categories (Access Categories). Further, priority control (Prioritized QoS) is provided in a way that gives a difference in quality of service (QoS) provided according to the category. The way of how the data is judged will be explained with reference to FIGS. 5 through 8.

Figure 5:
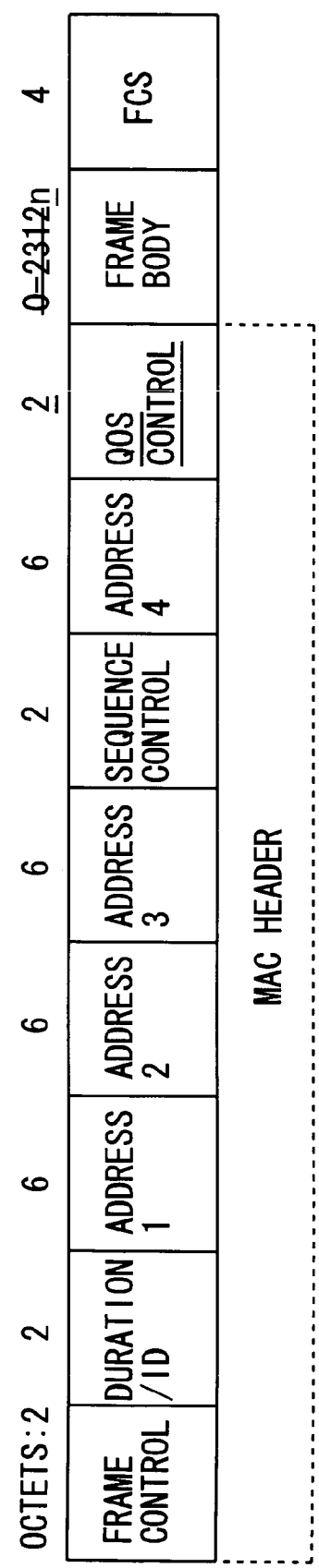
FIG. 5 is a diagram showing a MAC frame format (Media Access Control frame format) defined by IEEE802.11e.

FIG. 5 is a diagram showing a MAC frame format (Media Access Control frame format) defined in IEEE802.11e. The MAC frame format is a frame format for the packet transmitted and received between the access point and the client. In FIG. 5, the QoS Control is stored in a MAC Header in the MAC frame format.

FIG. 6 is a diagram showing a QoS Control field in FIG. 5. FIG. 7 is a diagram showing a TID field in FIG. 6. FIG. 7 shows how information showing a priority level is stored in the TID field occupied by head 4 bits in the QoS Control field. Values representing 0 through 7 in decimal notation are TC (Traffic Class) values. The TC values are values of 0 through 7, wherein the traffic classes are categorized into four, 0 through 3, ACs (Access Categories) according to IEEE802.11e. In the embodiment, when AC is 0, the data shall be categorized as the non-realtime system data, and, other than when AC is 0, the data shall be categorized as the realtime system data.

FIG. 7 is a diagram showing User priority to Access Category mappings. In FIG. 8, when the TC values are 0 through 2, the AC represents 0. When the AC is 0, the data shall be the non-realtime system data. Further, when the TC values are 3 through 7, the AC represents 1 through 3. Other than when the AC is 0, the data shall be the realtime system data.

The judging module 23 extracts the information recorded in the QoS Control field from the packet received by the wireless communication module 22. Then, the judging module 23 judges from the extracted information whether the data transmitted and received by the client is the realtime system data or the non-realtime system data. Then, the judging module 23 stores the type of the data transmitted and received by the client on the random access memory 6.

The receiving sensitivity acquisition module 24 queries the wireless LAN interface module 8 about the receiving sensitivity of each wireless channel employed when performing the communications with the client. Then, the receiving sensitivity acquisition module 24 receives the receiving sensitivity of each wireless channel used when performing the communications with the client from the wireless LAN interface module 8, and stores the receiving sensitivity on the random access memory 6.

The transmitting module 25, if the judging module 23 judges that the data transmitted and received by the client is the realtime system data, notifies the server that the data transmitted and received by the client is the realtime system data. Further, the transmitting module 25, if the judging module 23 judges that the data transmitted and received by the client is the non-realtime system data, notifies the server that the data transmitted and received by the client is the non-realtime system data. Moreover, the transmitting module 25 stores a connection count, with respect to each wireless channel, of the client transmitting and receiving the realtime system data and a connection count, with respect to each wireless channel, of the client transmitting and receiving the non-realtime system data on the random access memory 6.

The connection count, with respect to each wireless channel, of the client transmitting and receiving the realtime system data represents the number of clients transmitting and receiving the realtime system data by use of the wireless channels held by the access point. The number of clients exists in each wireless channel held by the access point. Further, the connection count, with respect to each wireless channel, of the clients transmitting and receiving the realtime system data represents the number of clients transmitting and receiving the non-realtime system data by use of the wireless channels held by the access point. The number of clients exists in each wireless channel held by the access point.

Moreover, the transmitting module 25 sends, to the server, the connection count, with respect to each wireless channel, of the client transmitting and receiving the realtime system data and the connection count, with respect to each wireless channel, of the client transmitting and receiving the non-realtime system data, which are stored on the random access memory 6.

The receiving module 26 receives first wireless channel information (the first wireless channel information corresponds to [first channel information] according to the present invention) transmitted by the server. The first wireless channel information connotes information about the wireless channel determined by the server in a case where the transmitting module 25 notifies the server that the data transmitted and received by the client is the non-realtime system data. Then, the receiving module 26 stores the received first wireless channel information on the random access memory 6.

Further, the receiving module 26 receives second wireless channel information (the second wireless channel information corresponds to [second channel information] according to the present invention) transmitted by the server. The second wireless channel information connotes information about the wireless channel determined by the server in a case where the transmitting module 25 notifies the server that the data transmitted and received by the client is the realtime system data. Then, the receiving module 26 stores the received second wireless channel information on the random access memory 6.

Moreover, the wireless communication module 22 employs, for the wireless LAN communications with the client, the wireless channel on the basis of the first wireless channel information stored on the random access memory 6. Furthermore, the wireless communication module 22 uses, for the wireless LAN communications with the client, the wireless channel on the basis of the second wireless channel information stored on the random access memory 6.

Figure 9:
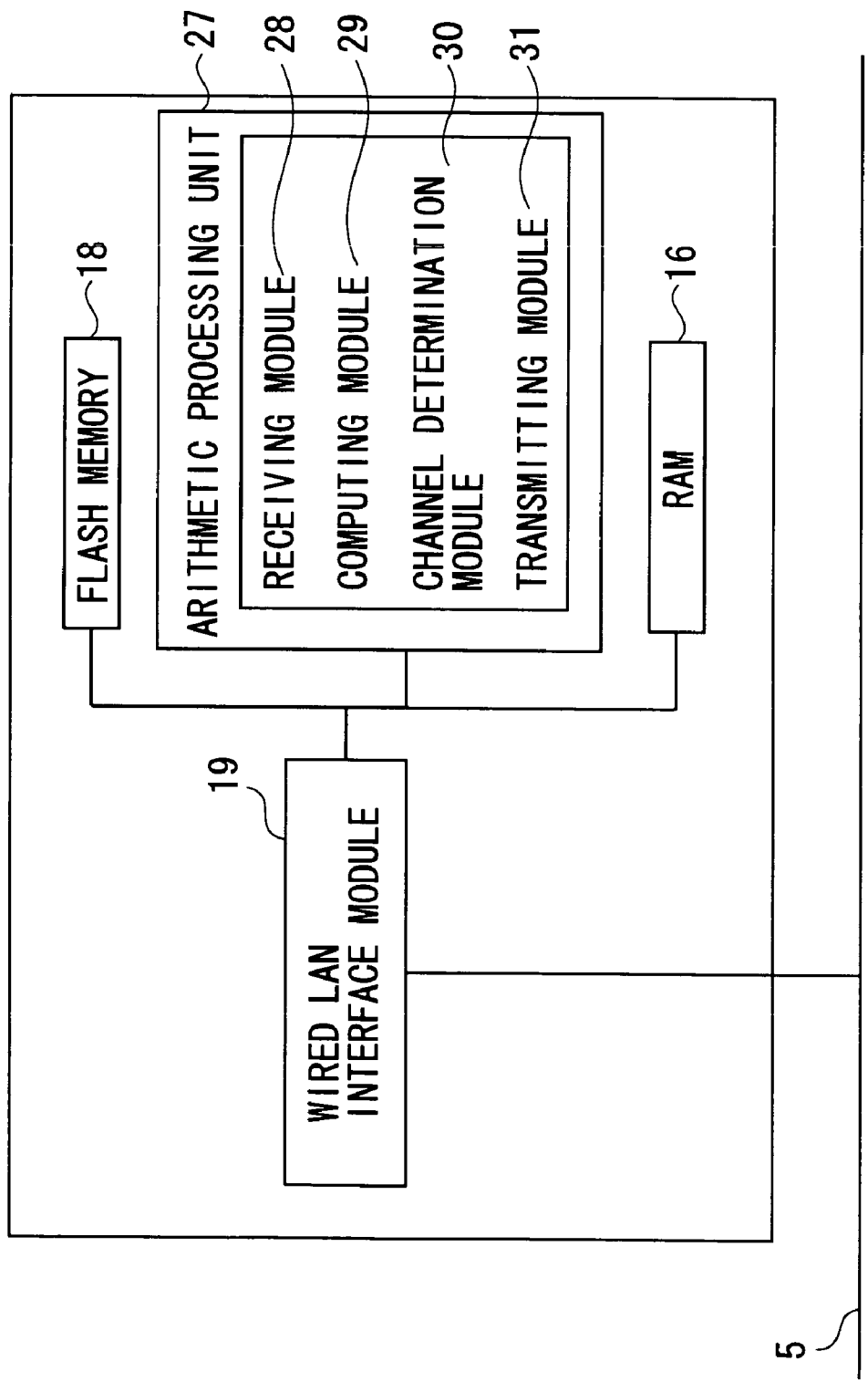
FIG. 9 is a block diagram showing functions of a server.

FIG. 9 is a function block diagram showing functions of the server. As shown in FIG. 9, the server has an arithmetic processing unit 27. The arithmetic processing unit 27 is constructed of a CPU, a main memory, etc, and has functions as a receiving module 28, a computing module 29, a channel determination module 30 and a transmitting module 31.

The receiving module 28 measures the receiving sensitivity of each wireless channel that each access point uses to transmit. Then, the receiving module 28 stores the thus-measured receiving sensitivity of each wireless channel on the random access memory 16. Further, the receiving module 28 receives, from the access point, the notification purporting that the data transmitted and received by the client is the non-realtime system data. Subsequently, the receiving module 28 stores the notification purporting that the data transmitted and received by the client is the non-realtime system data on the random access memory 16. Moreover, the receiving module 28 receives, from the access point, the notification purporting that the data transmitted and received by the client is the realtime system data. Then, the receiving module 28 stores the notification purporting that the data transmitted and received by the client is the realtime system data on the random access memory 16.

The receiving module 28 receives, from the access point, the connection count, with respect to each wireless channel, of the client transmitting and receiving the realtime system data. Then, the receiving module 28 stores the received connection count, with respect to each wireless channel, of the client transmitting and receiving the realtime system data on the random access memory 16. Moreover, the receiving module 28 receives, from the access point, the connection count, with respect to each wireless channel, of the client transmitting and receiving the non-realtime system data. Then, the receiving module 28 stores the received connection count, with respect to each wireless channel, of the client transmitting and receiving the non-realtime system data on the random access memory 16.

The computing module 29 computes a receiving sensitivity average value of each wireless channel from the receiving sensitivities of each wireless channel that are stored on the random access memory 16. Further, the computing module 29 stores the thus-computed receiving sensitivity average value of each wireless channel on the random access memory 16. Subsequently, the computing module 29 extracts the receiving sensitivity average value of each wireless channel that is stored on the random access memory 16, and computes a ratio of the receiving sensitivity average value (the ratio of the receiving sensitivity average value corresponds to a [predetermined value] according to the present invention) of each wireless channel. Namely, the computing module 29 computes the receiving sensitivity average value of each wireless channel as a ratio of each wireless channel. Further, the computing module 29 stores the computed ratio of the receiving sensitivity average value on the random access memory 16.

The channel determination module 30, when the receiving module 28 receives the notification purporting that the data transmitted and received by the client is the realtime system data, ranks the respective wireless channels by use of the ratio of the receiving sensitivity average value, and determines the wireless channels according to the ranking sequence from within the respective wireless channels about which the ratios of the receiving sensitivity average values have been computed. As an operation of the channel determination module 30, for example, the channel determination module 30, when the receiving module 28 receives the notification purporting that the data transmitted and received by the client is the realtime system data, determines the wireless channel exhibiting the largest ratio of the receiving sensitivity average value in the respective wireless channels about which the ratios of the receiving sensitivity average values have been computed.

Further, the channel determination module 30, after determining the wireless channel exhibiting the largest ratio of the receiving sensitivity average value and when the receiving module 28 receives the notification purporting that the data transmitted and received by the client is the realtime system data, determines the wireless channel exhibiting the next largest ratio of the receiving sensitivity average value in the respective wireless channels about which the ratios of the receiving sensitivity average values have been computed. Then, the channel determination module 30, each time the receiving module 28 receives the notification purporting that the data transmitted and received by the client is the realtime system data, sequentially determines the wireless channels in the sequence of the ratio of the receiving sensitivity average value from the largest. Moreover, the channel determination module 30 stores the determined wireless channels on the random access memory 16.

The channel determination module 30, when the receiving module 28 receives the notification purporting that the data transmitted and received by the client is the non-realtime system data, computes a value of the wireless channel in the following calculation formula (Formula 1) (the calculation formula (Formula 1) corresponds to a [predetermined conditional expression] according to the present invention), wherein the numerator is a sum of the connection count, with respect to each wireless channel, of the clients transmitting and receiving the realtime system data and the connection count, with respect to each wireless channel, of the clients transmitting and receiving the non-realtime system data, and the denominator is the ratio of the receiving sensitivity average value with respect to the wireless channel.

$$(D1+D2)/X \quad \text{(Formula 1)}$$

In the calculation formula (Formula 1), D1 is the connection count, with respect to each wireless channel, of the clients transmitting and receiving the realtime system data, and D2 is the connection count, with respect to each wireless channel, of the clients transmitting and receiving the non-realtime system data. Further, in the calculation formula (Formula 1), X is the ratio of the receiving sensitivity average value of each wireless channel. The connection count expressed in this calculation formula (Formula 1) is the connection count of the client with respect to the wireless channel specified at the ratio of the receiving sensitivity average value.

Then, the channel determination module 30 computes the value of each wireless channel by the calculation formula (Formula 1). Next, the channel determination module 30 determines the wireless channel exhibiting the smallest value of the wireless channel that is computed in the calculation formula (Formula 1). Moreover, the channel determination module 30 stores the thus-determined wireless channel on the random access memory 16.

The transmitting module 31, when the receiving module 28 receives the notification purporting that the data transmitted and received by the client is the realtime system data, transmits the channel information determined by the channel determination module 30 to the access point. Further, the transmitting module 31, when the receiving module 28 receives the notification purporting that the data transmitted and received by the client is the non-realtime system data, transmits the channel information determined by the channel determination module 30 to the access point.

Figure 10:
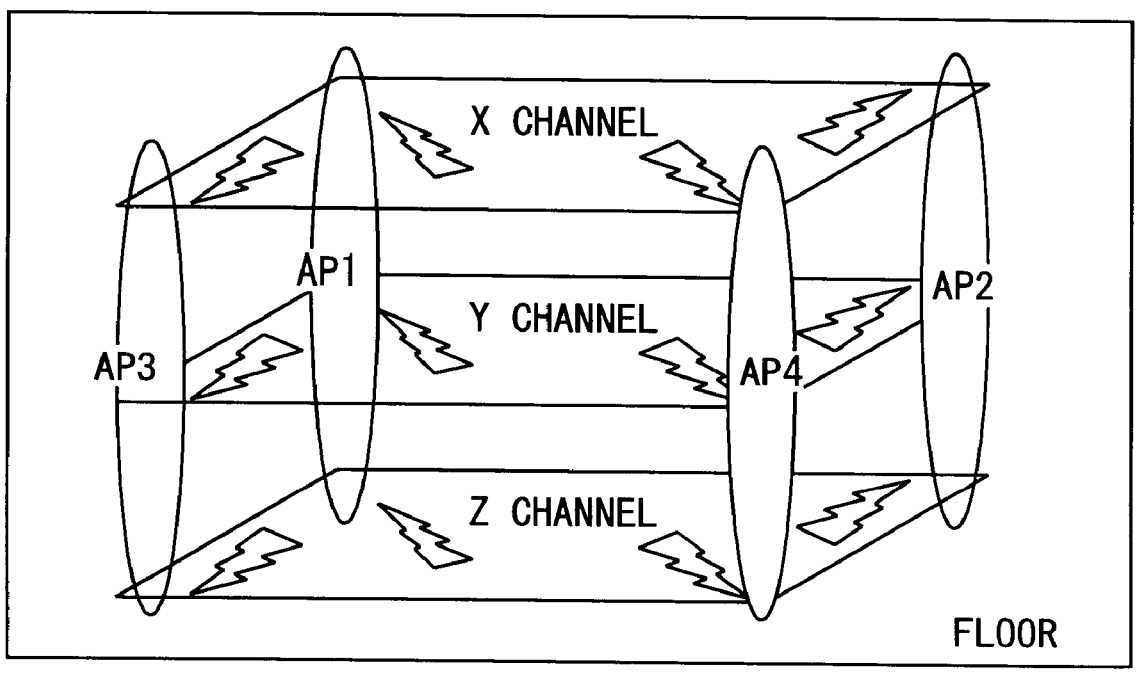
FIG. 10 is a diagram showing a configuration of wireless channels in a floor.

FIG. 10 is a diagram showing a configuration of the wireless channel in a floor. The access point performs the wireless LAN communications with the plurality of clients. Therefore, the access point has the plurality of wireless channels that do not interfere with other electronic devices etc. In FIG. 10, for instance, access points AP1, AP2, AP3, AP4 each have a channel X, a channel Y and a channel Z as the wireless channels, and are capable of communicating with the clients by use of the respective wireless channels. The individual access points are installed so that the respective channels of the individual access points do not interfere with each other. Namely, a radio wave reachable area of each access point is reduced by restricting a radio wave transmitting output of each channel of each access point, whereby the respective channels of the individual access points do not interfere with each other.

Figure 11:
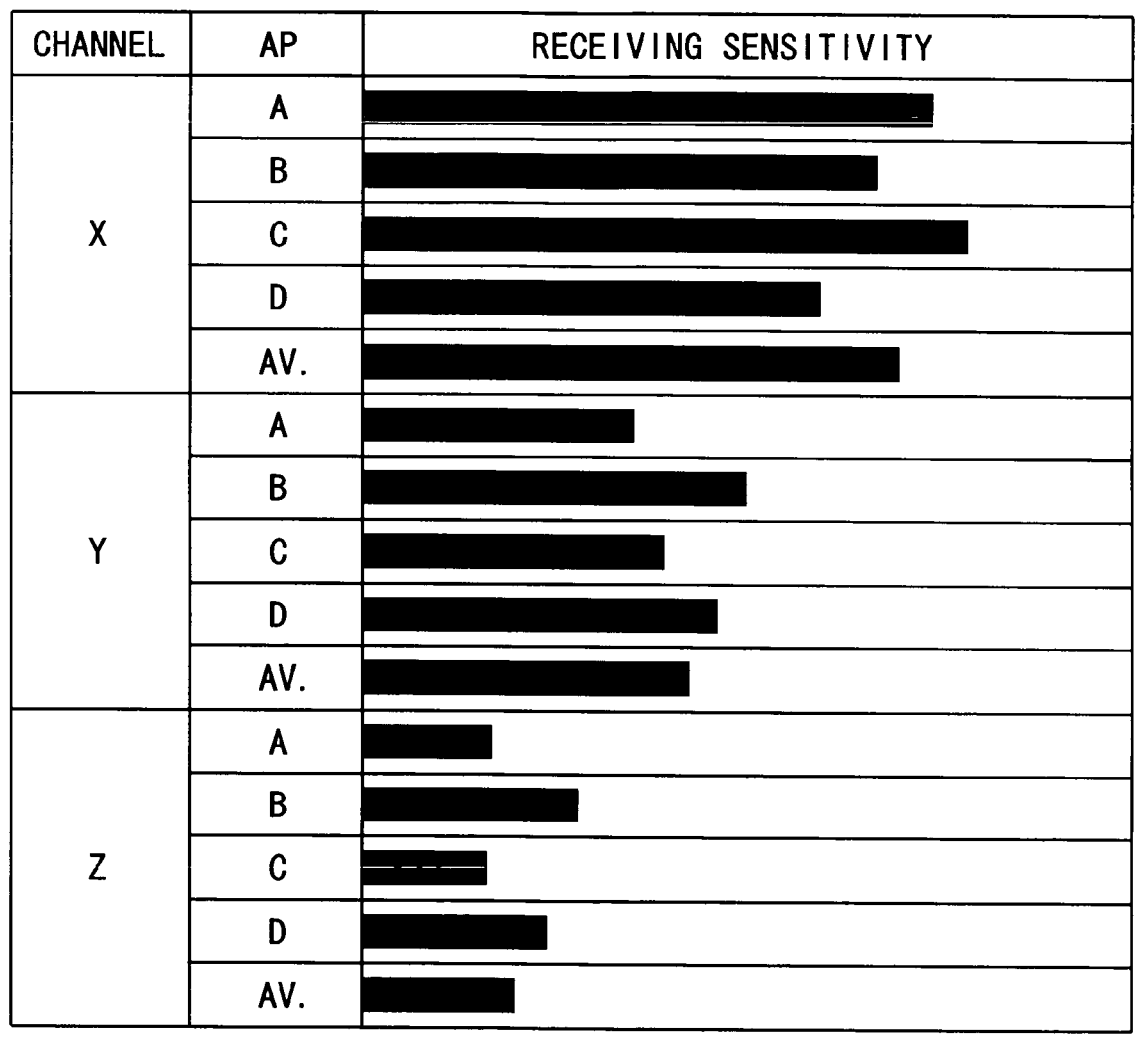
FIG. 11 is a diagram showing a receiving sensitivity of each wireless channel held by each access point and an average value thereof.

FIG. 11 is a diagram showing the receiving sensitivity and the average value thereof of each wireless channel held by each access point. FIG. 11 shows such as the type of the wireless channel, the receiving sensitivity of each wireless channel of each access point, and the receiving sensitivity average values of each wireless channel of all the access points.

The server computes, based on the aggregated receiving sensitivity via the LAN cable 5, the average value of the aggregated receiving sensitivity of each wireless channel of all the access points. Further, the server computes, based on the thus-computed average value of the receiving sensitivity of each wireless channel of all the access points, a ratio of the receiving sensitivity average value of each wireless channel.

In the embodiment, a load balancing procedure differs depending on which data, the realtime system data or the non-realtime system data, the client transmits and receives. When the client transmits and receives the realtime system data, as to such as the data of voices and images, the wireless channel exhibiting the high receiving sensitivity needs using in order to ensure a quality of the data. Further, if the client transmitting and receiving the realtime system data roams, it is required to connect with the access point of a roaming destination at the same wireless channel as the wireless channel of the access point of a roaming source in order to ensure the data quality. In the case of taking the load balance among the clients transmitting and receiving the realtime system data, areas formed by the plurality of access points are deemed as one area, wherein well-balanced connections of the clients with the respective wireless channels of the individual access points, are established. Even when the client performs roaming, it follows that the client is connected in the well balance to each wireless channel of the respective access points in areas deemed as one area.

For example, in the case of the client employing the channel X of a certain access point, an assumption is that this client roams to another access point and uses the channel X of the roaming destination. In this case, as viewed from the access point of the loaming source, a state is that the channel X of the roaming source is not employed. As viewed from areas deemed as one area, however, the state is that the channel X is employed. Therefore, even when the client transmitting and receiving the realtime system data roams, the respective wireless channels of the access points within the regions virtualized as one area can be used in the well balance. Such being the case, the client transmitting and receiving the realtime system data is connected to each channel on the basis of the ratio of the receiving sensitivity average value. The well-balanced usage of each channel can be attained based on the ratio of the receiving sensitivity average value, and hence the loads of the individual channels of the access point can be distributed (load balancing) corresponding to the receiving sensitivity average value of each channel.

On the other hand, in the case of the client transmitting and receiving the non-realtime system data, there arises none of the necessity for ensuring the data quality as high as the realtime system data. Therefore, in the case of taking the load balance among the clients transmitting and receiving the non-realtime system data, there does not necessarily arise the necessity for determining the wireless channel for connecting the client on the basis of only the receiving sensitivity. Further, in the case of the non-realtime system data, there is no necessity of maintaining the state of being connected to the same wireless channel. Hence, when the client roams, it is possible to establish the connection to the access point of the roaming destination by the wireless channel which is the same as the wireless channel of the access point of roaming source, or is different.

In the case of taking the load balance among the clients transmitting and receiving the non-realtime system data, the client is connected in the well balance to each wireless channel of each access point in a way that deems, as one area, the areas formed by the plurality of access points. When the client roams between the same channels, in the areas deemed as one area, there is kept the state where the client is connected in the well balance to each wireless channel of each access point. The client transmitting and receiving the non-realtime system data can, however, roam between the same or different channels. Accordingly, if the client roams between the different channels, in the areas deemed as one area, it follows that a bias occurs in the connection count of the client to the wireless channel of the access point.

Therefore, as to the client transmitting and receiving the non-realtime system data, the wireless channel to be connected shall be determined based on the connection count of the client to each wireless channel and the ratio of the receiving sensitivity average value. Hence, it is feasible to make the well-balanced usage of each channel of the access point and to distribute the loads of the respective channels of the access point, corresponding to the receiving sensitivity of each channel and the connection count of the client.

Figure 12:
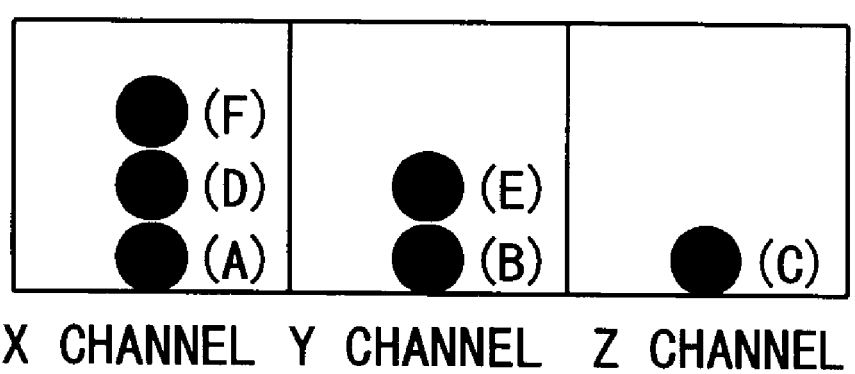
FIG. 12 is a diagram showing load-balancing in a case where a client transmits and receives realtime system data.

FIG. 12 is a diagram showing the load-balancing in the case of the client transmitting and receiving the realtime system data. The server, when receiving from the access point the notification purporting that the data is the realtime system data to be transmitted and received by the client, extracts the value of the ratio of the receiving sensitivity average value of each wireless channel that is stored on the random access memory 16.

Then, the server determines that the client be connected to the wireless channel having the larger value of the ratio of the receiving sensitivity average value. The server notifies each access point of the thus-determined wireless channel. A connecting sequence of the client to the respective wireless channels will be explained with reference to FIG. 12. FIG. 12 shows that the value of the ratio of the receiving sensitivity average value is 3:2:1 with respect to the channel X, the channel Y and the channel Z. In the embodiment, as for the ratios of the respective channels, the smallest value among the respective channels is set to 1, and, based on the smallest value "1", an integer ratio of each of other wireless channels is computed. Moreover, as for the ratios of the respective channels, the largest value among the respective channels is set to 1, and, based on the largest value "1", the value of each of other wireless channels may also be computed.

Moreover, (A) through (F) in FIG. 12 show the sequence of connection of the client to the respective channels. It should be noted that the embodiment exemplifies an example in which each access point has three wireless channels such as the channel X, the channel Y and the channel Z, however, the number of the wireless channels held by each access point is not limited to 3.

Further, FIG. 12 illustrates that six pieces clients are connected to the wireless channels of the access points. The connection count of the clients to the wireless channels of the access points in the case of connecting the six clients, is given based on the ratio of the receiving sensitivity average value, wherein tree clients are connected to the channel X, two clients are connected to the channel Y, and one client is connected to the channel Z. The embodiment exemplifies the instance where the six clients are connected, however, the connection count of the clients is not limited to 6, and FIG. 12 illustrates the sequence of how the connection of up to the sixth client is established.

The sequence of connecting the clients to each access point is given as follows. To start with, if none of the clients are connected to the access point, the first client is connected to the channel X having the largest value of the ratio of the receiving sensitivity average value. Next, the second client is connected to the channel Y having the second largest value of the ratio of the receiving sensitivity average value. Next, the third client is connected to the channel Z having the third largest value of the ratio of the receiving sensitivity average value. Subsequently, the fourth client is connected to the channel X, and the fifth client is connected to the channel Y. Then, the sixth client is connected to the channel X.

Figure 13:
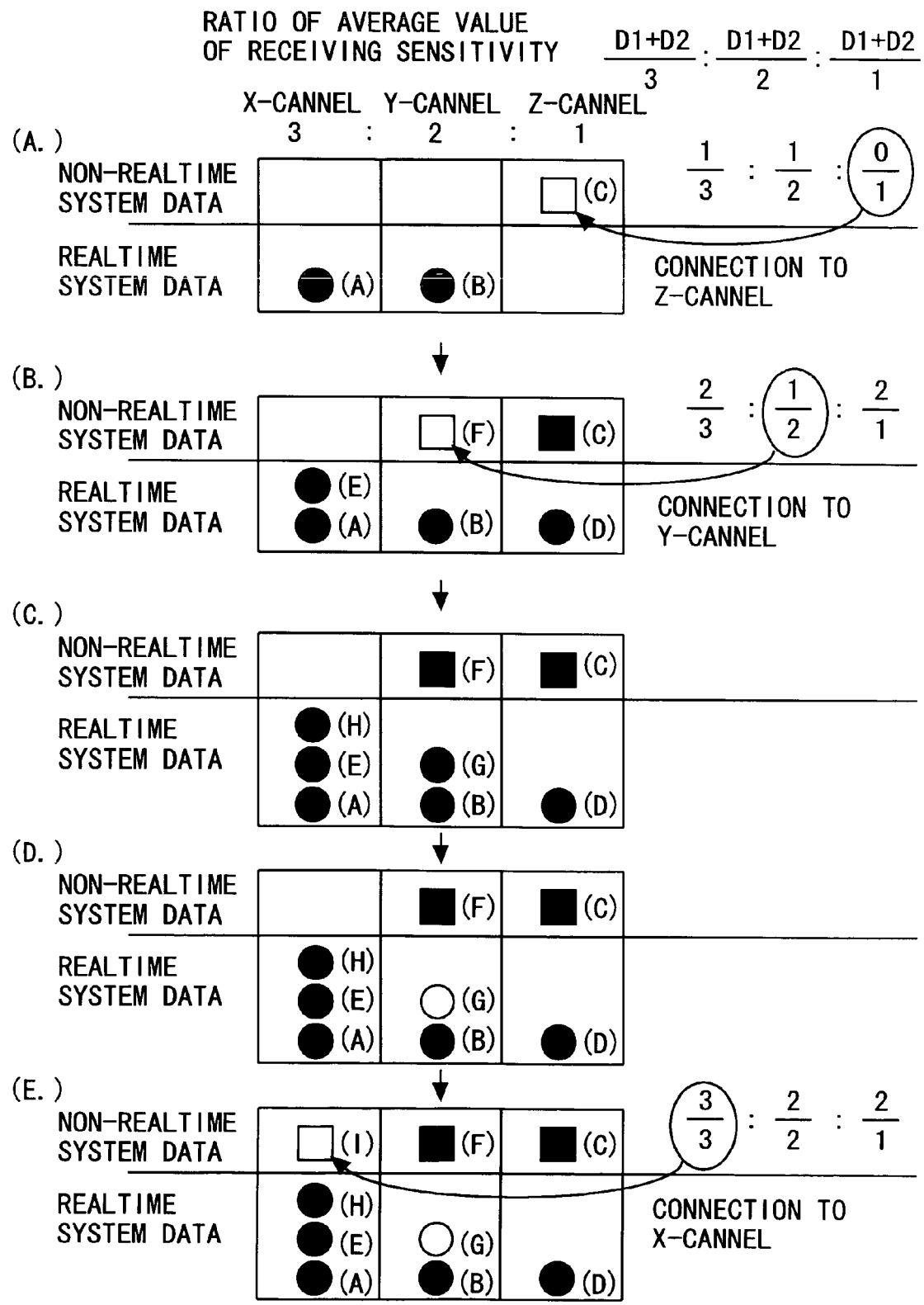
FIG. 13 is a diagram showing the load-balancing in a case where the client transmits and receives the realtime system data and non-realtime system data.

FIG. 13 is a diagram showing the load-balancing in the case where the client transmits and receives the realtime system data and the non-realtime system data. In the case of the client transmitting and receiving the realtime system data, in the same way as FIG. 12 illustrates, the load-balancing is executed based on the value of the ratio of the receiving sensitivity average value.

Computed is a value of each wireless channel in the following calculation formula (Formula 2), wherein the numerator is a sum of the connection count, with respect to each wireless channel, of the clients transmitting and receiving the realtime system data and the connection count, with respect to each wireless channel, of the clients transmitting and receiving the non-realtime system data, and the denominator is the value of the ratio of the receiving sensitivity average value.

$$(D1+D2)/Y \qquad \text{(Formula 2)}$$

In the calculation formula (Formula 2), D1 is the connection count, with respect to each wireless channel, of the clients transmitting and receiving the realtime system data, and D2 is the connection count, with respect to each wireless channel, of the clients transmitting and receiving the non-realtime system data. Further, in the calculation formula (Formula 2), Y is the ratio of the receiving sensitivity average value of each wireless channel. The server determines the wireless channel exhibiting the smallest value of the ratio of each wireless channel in the values computed in the calculation formula (Formula 2).

An explanation of how the wireless channel having the smallest value of the ratio of each wireless channel is determined by use of the calculation formula (Formula 2) and then the client is connected, will be made referring to FIG. 13. Including the value of the ratio of the receiving sensitivity average value of each wireless channel into the calculation formula (Formula 2), the following calculation formula (Formula 3) is given such as:

(D1+D2)/x:(D1+D2)/y:(D1+D2)/z            (Formula 3)

In the calculation formula (Formula 3), D1 is the connection count, with respect to each wireless channel, of the clients transmitting and receiving the realtime system data, D2 is the connection count, with respect to each wireless channel, of the clients transmitting and receiving the non-realtime system data, x is the cannel X's value of the ratio of the receiving sensitivity average value of the wireless channel, y is the cannel Y's value, and z is the cannel Z's value. The server determines the wireless channel exhibiting the smallest value of the ratio in the values computed in the calculation formula (Formula 3).

In FIG. 13, the value of the ratio of the receiving sensitivity average value assumes 3:2:1, wherein the channel X is given 3, the channel Y is given 2, and the channel Z is given 1. In the value of the ratio of the receiving sensitivity average value, as in the case of FIG. 12, the channel Z having the smallest value of the ratio of the receiving sensitivity average value is given 1. Then, based on the value of this channel Z, the channel X' value and the channel Y' value are computed. Further, in FIG. 13, (A) through (I) represent the connecting sequence of the client to the respective channels. A solid black circle in FIG. 13 implies that the client transmitting and receiving the realtime system data is connected to the access point. Moreover, a white void circle in FIG. 13 implies that the client transmitting and receiving the realtime system data is disconnected from the access point. A white void square in FIG. 13 implies that the client transmitting and receiving the non-realtime system data is on the verge of being connected to the access point. A black solid square in FIG. 13 implies that the client transmitting and receiving the non-realtime system data is connected to the access point.

(A.) in FIG. 13 shows a case where the client transmitting and receiving the non-realtime system data is connected to the channel Z. Further, in (A.) in FIG. 13, the two clients transmitting and receiving the realtime system data are connected to the channel X and to the channel Y. Moreover, in FIG. 13, the connecting sequence of the clients transmitting and receiving the realtime system data is pursuant to the sequence explained in FIG. 12. Accordingly, the connecting sequence is that the first client is connected to the channel X having the largest value of the ratio of the receiving sensitivity average value, and the second client is connected to the channel Y having the second largest value of the ratio of the receiving sensitivity average value.

The case (A.) in FIG. 13 is such that according to the calculation formula (Formula 3), the channel X is given 1/3, the channel Y is given 1/2, and the channel Z is given 0/1. The channel Z has the smallest value, and hence the client transmitting and receiving the non-realtime system data is connected to the channel Z.

(B.) in FIG. 13 shows a case of how the clients transmitting and receiving the non-realtime system data are connected. Further, the four clients transmitting and receiving the realtime system data are connected to the respective wireless channels, and one client transmitting and receiving the non-realtime system data is connected to the channel Z. The connecting sequence of the first through third clients to the respective wireless channels of the access point is the same as (A.) in FIG. 13 shows. The fourth client transmitting and receiving the realtime system data is connected to the channel Z. The fifth client transmitting and receiving the realtime system data is connected to the channel X.

The case of (C.) in FIG. 13 is such that according to the calculation formula (Formula 3), the channel X is given 2/3, the channel Y is given 1/2, and the channel Z is given 2/1. The channel Y has the smallest value, and therefore the sixth client is connected to the channel Y. (C.) in FIG. 13 illustrates a case of how the six clients transmitting and receiving the realtime system data are connected, and the two clients transmitting and receiving the non-realtime system data are connected. The connecting sequence of the first through sixth clients is the same as in (A.) and (B.) in FIG. 13. The seventh client transmits and receives the realtime system data and is therefore connected to the channel Y, and the eighth client transmits and receives the realtime system data and is therefore connected to the channel Z.

(D.) in FIG. 13 illustrates that the seventh client explained in (C.) in FIG. 13 finishes transmitting and receiving the realtime system data and is disconnected from the channel Y. (E.) in FIG. 13 illustrates that the client transmitting and receiving the non-realtime system data connects to the channel X. In the case of (E.) in FIG. 13, according to the calculation formula (Formula 3), the channel X is given 3/3, the channel Y is given 2/2, and the channel Z is given 2/1. Herein, the client, which is connected seventh, has already finished transmitting and receiving the realtime system data and been disconnected from the channel Y. Accordingly, the client, which has finished transmitting and receiving the realtime system data and been disconnected from the channel Y, is not counted into the connection count of the clients in the calculation formula (Formula 3). In the calculation formula (Formula 3), the channel X and the channel Y take the same value, however, the ninth client transmitting and receiving the non-time system data is connected to the channel X having a large value of the receiving sensitivity average value.

The connecting sequence of the clients to the respective wireless channels has been explained in FIG. 13. If there exists a plurality of access points with which the client can communicate, as to which sequence the client is connected to the respective access points, the client may be connected to the access points having the wireless channels exhibiting the high receiving sensitivity in sequence, and may also be connected in one of other sequences to the individual access points.

Figure 14:
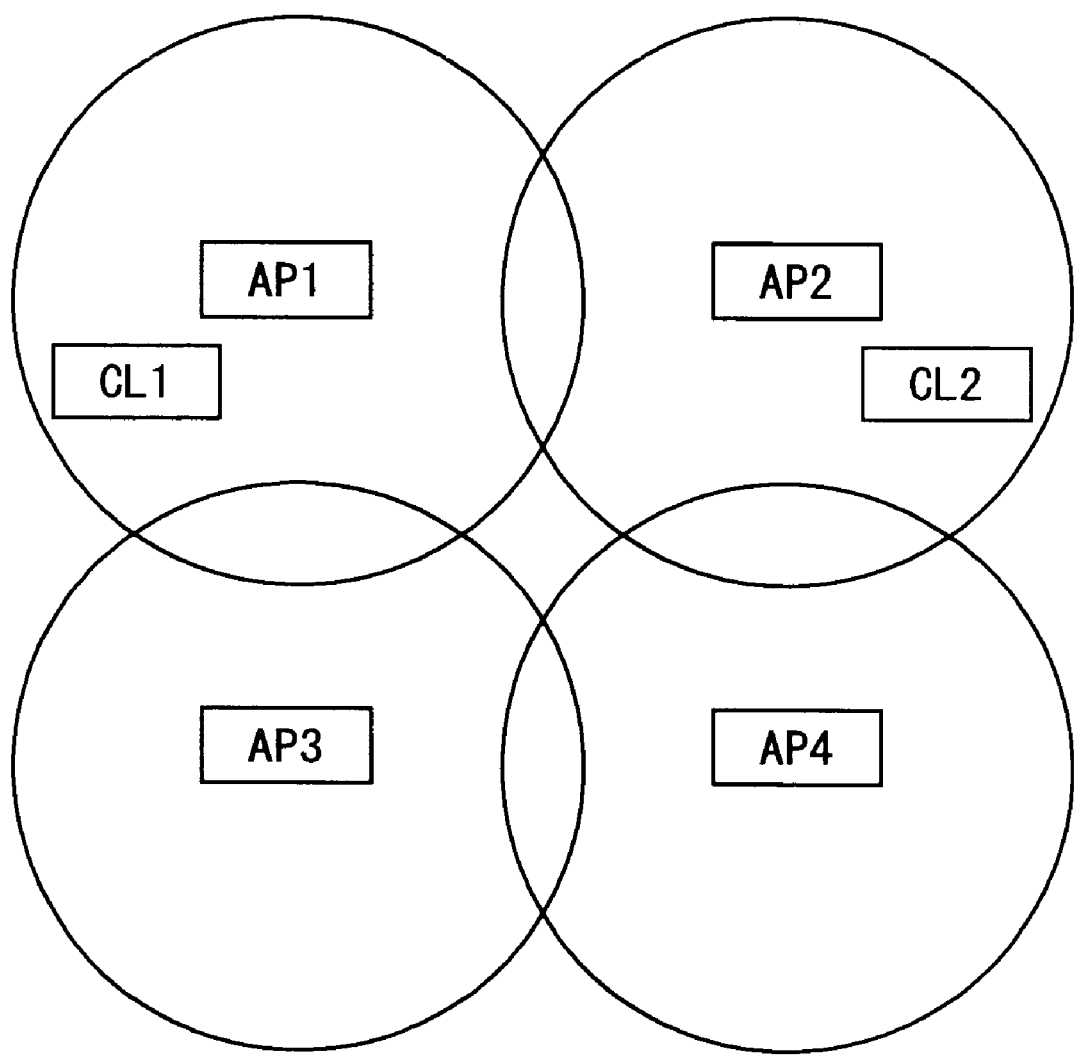
FIG. 14 is a diagram showing the load-balancing among the clients with respect to the respective access points.

FIG. 14 is a diagram showing the load-balancing among the clients with respect to each access point. FIG. 14 shows that the access points 1 through 4 exist (in FIG. 14, these access points are designated by AP1, AP2, AP3, AP4, respectively). Each access point has a communication-enabled area. In the embodiment, the areas, to which the respective access points belong, are deemed as one area, whereby the load-balancing among the clients are executed.

The client 1 (designated by CL1 in FIG. 14) exists in the communication-enabled area of the access point 1. When the client 1 transmits and receives the realtime system data, the load-balancing is performed by employing the access points 1 through 4. The client 2 (designated by CL2 in FIG. 14) exists in the communication-enabled area of the access point 2. When the client 2 transmits and receives the non-realtime system data, the load-balancing is performed by employing the access points 1 through 4.

Figure 15:
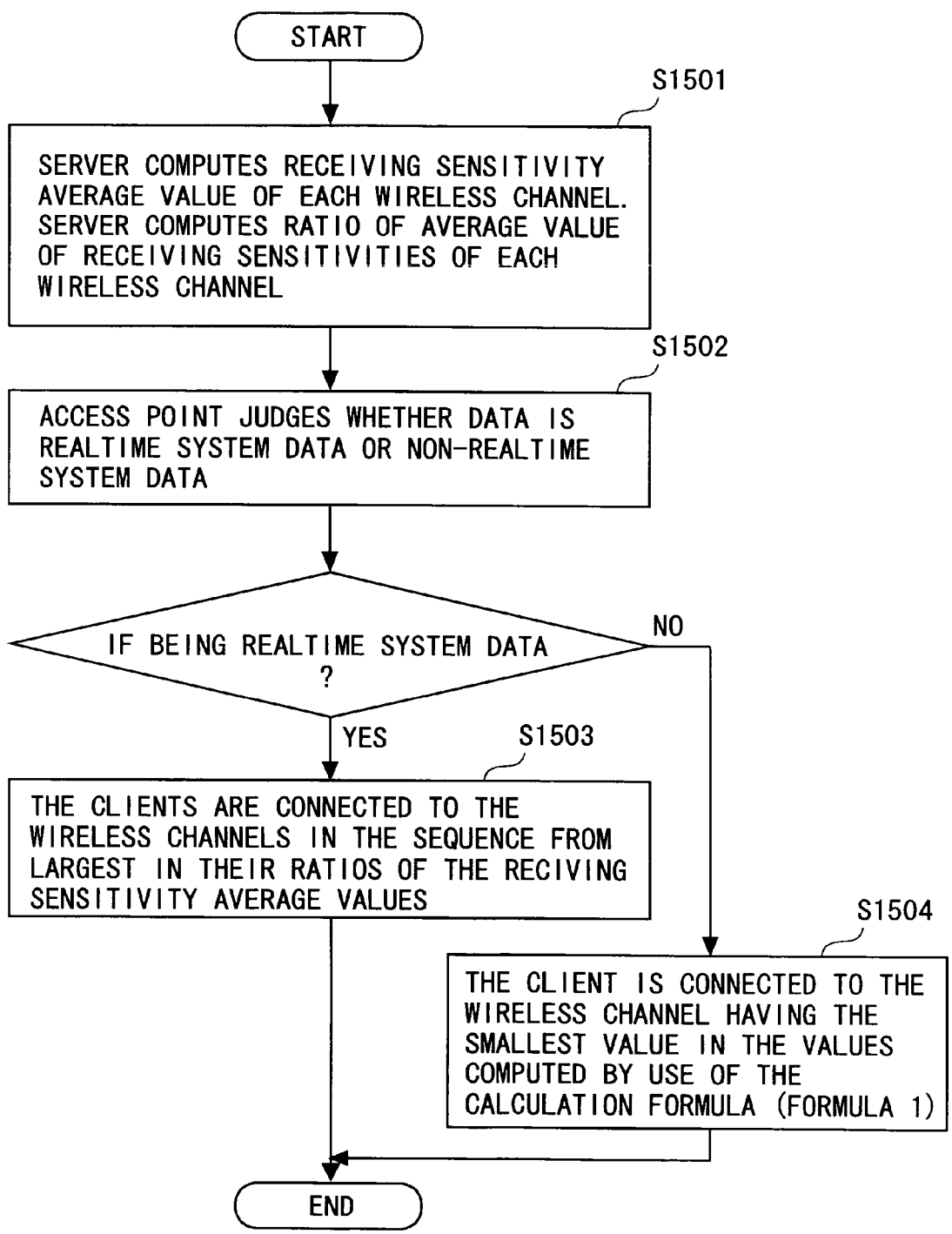
FIG. 15 is a flowchart showing a process of the load-balancing in the case of connecting the clients to the access points in the embodiment.

FIG. 15 is a flowchart showing a process of the load-balancing in the case where the clients according to the embodiment are connected to the access points. To begin with, the server computes the receiving sensitivity average value of each wireless channel from the receiving sensitivities of the individual wireless channels that are received from each access point. Next, the server computes a ratio of the receiving sensitivity average value of each wireless channel on the basis of the computed receiving sensitivity average value of each wireless channel (S1501).

Next, the access point judges whether the data transmitted and received by the client is the realtime system data or not (S1502). The judgment as to whether the data transmitted and received by the client is the realtime system data or not, is made based on the Standard of IEEE (Institute of Electrical and Electronic Engineers) 802.11e. The judgment based on the Standard of IEEE802.11e has already been described with reference to FIGS. 5 through 8, and therefore its explanation is omitted herein.

When judging that the data is the realtime system data, a process in S1503 is executed. While on the other hand, when judging that the data is not the realtime system data, a process in S1504 is executed. In the case of judging that the data is the realtime system data, the clients are connected to the wireless channels in the sequence from the largest in their ratios of the receiving sensitivity average values (S1503). Note that the connecting sequence to the respective wireless channels is pursuant to the sequence explained in FIG. 12. Then, the load-balancing process is finished.

Whereas if the data is judged not to be the realtime system data, the client is connected to the wireless channel having the smallest value in the values computed by use of the calculation formula (Formula 1) (S1504). It is to be noted that the connecting sequence to the respective wireless channels is pursuant to the sequence explained in FIG. 13. Then, the load-balancing process is finished.

Thus, according to the embodiment, the access point judges beforehand whether the data transmitted and received by the client is the realtime system data or the non-realtime system data, and the clients transmitting and receiving the realtime system data and the clients transmitting and receiving the non-realtime system data can be connected in the well balance to the wireless channels held by the respective access points. Moreover, according to the embodiment, the clients are connected in the well balance to the wireless channels held by the respective access points, thereby enabling the wireless LAN resources to be effectively utilized.

<Readable-by-Computer Recording Medium>

A program for making a computer actualize any of the functions described above can be recorded on a recording medium readable by the computer. Then, the computer is made to read and execute the program on this recording medium, whereby the functions can be provided. Herein, the recording medium readable by the computer connotes a recording medium capable of storing information such as data and programs electrically, magnetically, optically, mechanically or by chemical action, which can be read from the compute. Among these recording mediums, for example, a flexible disc, a magneto-optic disc, a CD-ROM, a CD-R/W, a DVD, a DAT, an 8 mm tape, a memory card, etc are given as those demountable from the computer. Further, a hard disc, a ROM (Read-Only Memory), etc are given as the recording mediums fixed within the computer.

(Note 1) A wireless device performing wireless communication with a plurality of user devices and performing wire communication with a server, comprising:

a wireless communication module performing wireless communication with the user devices by use of a plurality of channels;

a judging module judging whether information transmitted and received by the user devices is non-realtime system data or realtime system data;

a receiving sensitivity acquisition module acquiring a receiving sensitivity of each channel;

a transmitting module transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel; and a receiving module receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server.

(Note 2) The wireless device according to note 1, wherein the wireless communication module employs the channels for the wireless communication with the user devices on the basis of the first channel information or the second channel information.

(Note 3) The wireless device according to note 2, wherein the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information.

(Note 4) The wireless device according to note 2, wherein the server, when receiving the notification that the information transmitted and received by the user devices is the non-realtime system data, calculates an average value of the receiving sensitivity of each channel from the receiving sensitivity of each channel, ranks the channels on the basis of the calculated average value of the receiving sensitivity of each channel and the number of the user devices, determines the first channel information according to the ranking sequence and transmits the first channel information, wherein the server, when receiving the notification that the information transmitted and received by the user devices is the realtime system data, calculates an average value of the receiving sensitivity of each channel from the receiving sensitivity of each channel, ranks the channels on the basis of the calculated average value of the receiving sensitivity of each channel, determines the second channel information according to the ranking sequence and transmits the second channel information.

(Note 5) The server performing wire communication with a plurality of wireless devices, comprising:

a receiving module receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels;

a calculating module calculating a predetermined value from the receiving sensitivity of each channel;

a channel determination module, when receiving notification purporting that the information transmitted and received by the user devices is non-realtime system data, determining the first channel information on the basis of a predetermined conditional expression from the number of user devices and the predetermined value; and a transmitting module transmitting the thus-determined first channel information to the wireless devices.

(Note 6) The server according to note 5, wherein the channel determination module, when receiving the notification purporting that the information transmitted and received by the user devices is the realtime system data, determines the second channel information on the basis of the predetermined value, and the transmitting module transmits the thus-determined second channel information to the wireless devices.

(Note 7) The server performing wire communication with a plurality of wireless devices, comprising:

a receiving module receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels;

a calculating module calculating an average value of receiving sensitivity of each channel from the receiving sensitivity of each channel;

a channel determination module, when receiving notification purporting that the information transmitted and received by the user devices is non-realtime system data, ranking the channels on the basis of the number of the user devices and the average value of the receiving sensitivity of each channel, and determining the first channel information according to the ranking sequence; and a transmitting module transmitting the thus-determined first channel information to the wireless devices.

(Note 8) The server according to note 7, wherein the channel determination module, when receiving the notification purporting that the information transmitted and received by the user devices is the realtime system data, ranks the channels on the basis of the average value of the receiving sensitivity of each channel, and determines the second channel information according to the ranking sequence, and the transmitting module transmits the thus-determined second channel information to the wireless devices.

(Note 9) The control method of a wireless device performing wireless communication with a plurality of user devices and performing wire communication with a server, comprising:

a wireless communication step of performing wireless communication with the user devices by use of a plurality of channels;

a judging step of judging whether information transmitted and received by the user devices is non-realtime system data or realtime system data;

a receiving sensitivity acquisition step of acquiring a receiving sensitivity of each channel;

a transmitting step of transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel; and a receiving step of receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server.

(Note 10) The control method of a wireless device according to note 9, wherein the wireless communication step includes employing the channels for the wireless communication with the user devices on the basis of the first channel information or the second channel information.

(Note 11) The control method of a wireless device according to note 10, wherein the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information.

(Note 12) The control method of a wireless device according to note 10, wherein the server, when receiving the notification that the information transmitted and received by the user devices is the non-realtime system data, calculates an average value of the receiving sensitivity of each channel from the receiving sensitivity of each channel, ranks the channels on the basis of the calculated average value of the receiving sensitivity of each channel and the number of the user devices, determines the first channel information according to the ranking sequence and transmits the first channel information, wherein the server, when receiving the notification that the information transmitted and received by the user devices is the realtime system data, calculates an average value of the receiving sensitivity of each channel from the receiving sensitivity of each channel, ranks the channels on the basis of the calculated average value of the receiving sensitivity of each channel, determines the second channel information according to the ranking sequence and transmits the second channel information.

(Note 13) The control method of a server performing wire communication with a plurality of wireless devices, comprising:

a receiving step of receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user device by use of the channels;

a calculating step of calculating a predetermined value from the receiving sensitivity of each channel;

a channel determination step of, when receiving notification purporting that the information transmitted and received by the user devices is non-realtime system data, determining the first channel information on the basis of a predetermined conditional expression from the number of user devices and the predetermined value; and a transmitting step of transmitting the thus-determined first channel information to the wireless devices.

(Note 14) The control method of a server according to note 13, wherein the channel determination step includes, when receiving the notification purporting that the information transmitted and received by the user devices is the realtime system data, determining the second channel information on the basis of the predetermined value, and the transmitting step includes transmitting the thus-determined second channel information to the wireless devices.

(Note 15) The control method of a server performing wire communication with a plurality of wireless devices, comprising:

a receiving step of receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels;

a calculating step of calculating an average value of receiving sensitivity of each channel from the receiving sensitivity of each channel;

a channel determination step of, when receiving notification purporting that the information transmitted and received by the user devices is non-realtime system data, ranking the channels on the basis of the number of the user devices and the average value of the receiving sensitivity of each channel, and determining the first channel information according to the ranking sequence; and a transmitting step of transmitting the thus-determined first channel information to the wireless devices.

(Note 16) The control method of a server according to note 15, wherein the channel determination step includes, when receiving the notification purporting that the information transmitted and received by the user devices is the realtime system data, ranking the channels on the basis of the average value of the receiving sensitivity of each channel, and determining the second channel information according to the ranking sequence, and the transmitting step includes transmitting the thus-determined second channel information to the wireless devices.

(Note 17) The computer readable storage medium storing a control program of a wireless device performing wireless communication with a plurality of user devices and performing wire communication with a server, comprising:

a wireless communication step of performing wireless communication with the user devices by use of a plurality of channels;

a judging step of judging whether information transmitted and received by the user devices is non-realtime system data or realtime system data;

a receiving sensitivity acquisition step of acquiring a receiving sensitivity of each channel;

a transmitting step of transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel; and a receiving step of receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server.

(Note 18) The computer readable storage medium storing a control program of a wireless device according to note 17, wherein the wireless communication step includes employing the channels for the wireless communication with the user devices on the basis of the first channel information or the second channel information.

(Note 19) The computer readable storage medium storing a control program of a wireless device according to note 18, wherein the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information.

(Note 20) The computer readable storage medium storing a control program of a wireless device according to note 18, wherein the server, when receiving the notification that the information transmitted and received by the user devices is the non-realtime system data, calculates an average value of the receiving sensitivity of each channel from the receiving sensitivity of each channel, ranks the channels on the basis of the calculated average value of the receiving sensitivity of each channel and the number of the user devices, determines the first channel information according to the ranking sequence and transmits the first channel information, wherein the server, when receiving the notification that the information is transmitted and received by the user devices the realtime system data, calculates an average value of the receiving sensitivity of each channel from the receiving sensitivity of each channel, ranks the channels on the basis of the calculated average value of the receiving sensitivity of each channel, determines the second channel information according to the ranking sequence and transmits the second channel information.

(Note 21) The computer readable storage medium storing a control program of a server performing wire communication with a plurality of wireless devices, comprising:

a receiving step of receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user device by use of the channels;

a calculating step of calculating a predetermined value from the receiving sensitivity of each channel;

a channel determination step of, when receiving notification purporting that the information transmitted and received by the user device is non-realtime system data, determining the first channel information on the basis of a predetermined conditional expression from the number of user devices and the predetermined value; and a transmitting step of transmitting the thus-determined first channel information to the wireless devices.

(Note 22) The computer readable storage medium storing a control program of a server according to note 21, wherein the channel determination step includes, when receiving the notification purporting that the information transmitted and received by the user device is the realtime system data, determining the second channel information on the basis of the predetermined value, and the transmitting step includes transmitting the thus-determined second channel information to the wireless devices.

(Note 23) The computer readable storage medium storing a control program of a server performing wire communication with a plurality of wireless devices, comprising:

a receiving step of receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels;

a calculating step of calculating an average value of receiving sensitivity of each channel from the receiving sensitivity of each channel;

a channel determination step of, when receiving notification purporting that the information transmitted and received by the user devices is non-realtime system data, ranking the channels on the basis of the number of the user devices and the average value of the receiving sensitivity of each channel, and determining the first channel information according to the ranking sequence; and a transmitting step of transmitting the thus-determined first channel information to the wireless devices.

(Note 24) The computer readable storage medium storing a control program of a server according to note 23, wherein the channel determination step includes, when receiving the notification purporting that the information transmitted and received by the user device is the realtime system data, ranking the channels on the basis of the average value of the receiving sensitivity of each channel, and determining the second channel information according to the ranking sequence, and the transmitting step includes transmitting the thus-determined second channel information to the wireless devices.

<Others>

The disclosures of Japanese patent application No. JP2005-254131 filed on Sep. 1, 2005 including the specification, drawings and abstract are incorporated herein by reference.

What is claimed is:

1. A wireless device performing wireless communication with a plurality of user devices and performing wire communication with a server, comprising:

a wireless communication module performing wireless communication with the user devices by use of a plurality of channels;

a judging module judging whether information transmitted and received by the user devices is non-realtime system data or realtime system data;

a receiving sensitivity acquisition module acquiring a receiving sensitivity of each channel;

a transmitting module transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel; and a receiving module receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server.

2. The wireless device according to claim 1, wherein the wireless communication module employs the channels for the wireless communication with the user devices on the basis of the first channel information or the second channel information.

3. The wireless device according to claim 2, wherein the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information.

4. The wireless device according to claim 2, wherein the server, when receiving the notification that the information transmitted and received by the user devices is the non-realtime system data, calculates an average value of the receiving sensitivity of each channel from the receiving sensitivity of each channel, ranks the channels on the basis of the calculated average value of the receiving sensitivity of each channel and the number of the user devices, determines the first channel information according to the ranking sequence and transmits the first channel information, wherein the server, when receiving the notification that the information transmitted and received by the user devices is the realtime system data, calculates an average value of the receiving sensitivity of each channel from the receiving sensitivity of each channel, ranks the channels on the basis of the calculated average value of the receiving sensitivity of each channel, determines the second channel information according to the ranking sequence and transmits the second channel information.

5. A server performing wire communication with a plurality of wireless devices, comprising:

a receiving module receiving, from the wireless devices transmitting and receiving information with a plurality of user devices by use of a plurality of channels, a receiving sensitivity of each channel, notification purporting that the information transmitted and received by the user devices is non-realtime system data or realtime system data, and the number of the user devices performing wireless communication with the user devices by use of the channels;

a calculating module calculating a predetermined value from the receiving sensitivity of each channel;

a channel determination module, when receiving notification purporting that the information transmitted and received by the user devices is non-realtime system data, determining the first channel information on the basis of a predetermined conditional expression from the number of user devices and the predetermined value; and a transmitting module transmitting the thus-determined first channel information to the wireless devices.

6. The server according to claim 5, wherein the channel determination module, when receiving the notification purporting that the information transmitted and received by the user devices is the realtime system data, determines the second channel information on the basis of the predetermined value, and the transmitting module transmits the thus-determined second channel information to the wireless devices.

7. A control method of a wireless device performing wireless communication with a plurality of user devices and performing wire communication with a server, comprising:

a wireless communication step of performing wireless communication with the user devices by use of a plurality of channels;

a judging step of judging whether information transmitted and received by the user devices is non-realtime system data or realtime system data;

a receiving sensitivity acquisition step of acquiring a receiving sensitivity of each channel;

a transmitting step of transmitting, to the server, the number of user devices performing the wireless communication by use of the channels, a notification that the information transmitted and received by the user devices is the non-realtime system data or a notification that the information transmitted and received by the user devices is the realtime system data, and the receiving sensitivity of each channel; and a receiving step of receiving, when transmitting to the server the notification that the information transmitted and received by the user devices is the non-realtime system data, a first channel information sent by the server, and receiving, when transmitting to the server the notification that the information transmitted and received by the user devices is the realtime system data, a second channel information sent by the server.

8. The control method of a wireless device according to claim 7, wherein the wireless communication step includes employing the channels for the wireless communication with the user devices on the basis of the first channel information or the second channel information.

9. The control method of a wireless device according to claim 8, wherein the server, when receiving the notification that the information transmitted and received by the user devices is the non-realtime system data, calculates a predetermined value from the receiving sensitivity of each channel, determines the first channel information on the basis of a predetermined conditional expression from the thus-calculated predetermined value and the number of the user devices, and transmits the first information, wherein the server, when receiving the notification that the information transmitted and received by the user devices is the realtime system data, calculates a predetermined value from the receiving sensitivity of each channel, determines the second channel information on the basis of the thus-calculated predetermined value and transmits the second channel information.

10. The control method of a wireless device according to claim 8, wherein the server, when receiving the notification that the information transmitted and received by the user devices is the non-realtime system data, calculates an average value of the receiving sensitivity of each channel from the receiving sensitivity of each channel, ranks the channels on the basis of the calculated average value of the receiving sensitivity of each channel and the number of the user devices, determines the first channel information according to the ranking sequence and transmits the first channel information, wherein the server, when receiving the notification that the information transmitted and received by the user devices is the realtime system data, calculates an average value of the receiving sensitivity of each channel from the receiving sensitivity of each channel, ranks the channels on the basis of the calculated average value of the receiving sensitivity of each channel, determines the second channel information according to the ranking sequence and transmits the second channel information.

* * * * *